F. E. DILLMAN.
AUTOMOBILE OPERATED POWER PLANT.
APPLICATION FILED MAR. 21, 1917.

1,263,215.

Patented Apr. 16, 1918.
2 SHEETS—SHEET 1.

Inventor
F. E. Dillman
By Watson E. Coleman
Attorney

F. E. DILLMAN.
AUTOMOBILE OPERATED POWER PLANT.
APPLICATION FILED MAR. 21, 1917.
1,263,215.
Patented Apr. 16, 1918.
2 SHEETS—SHEET 2.
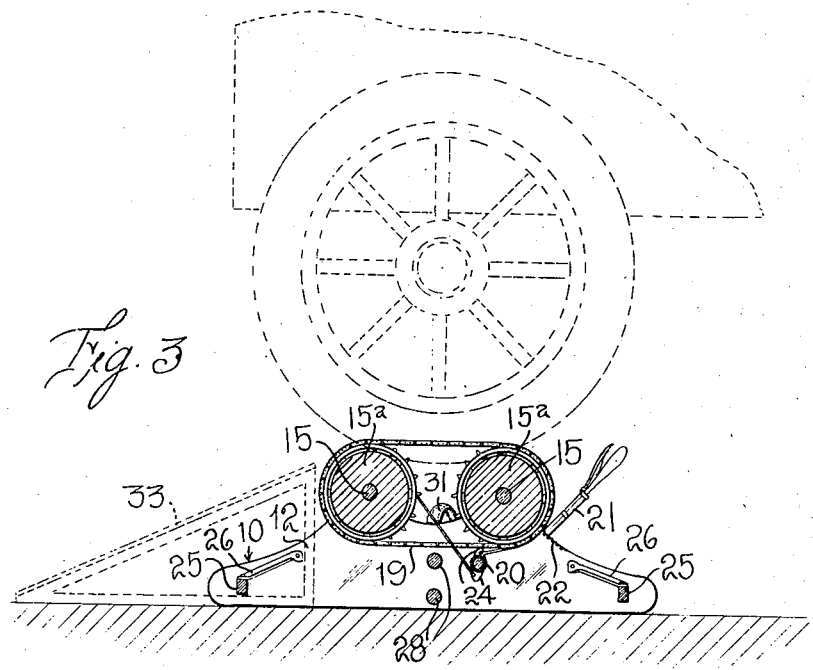
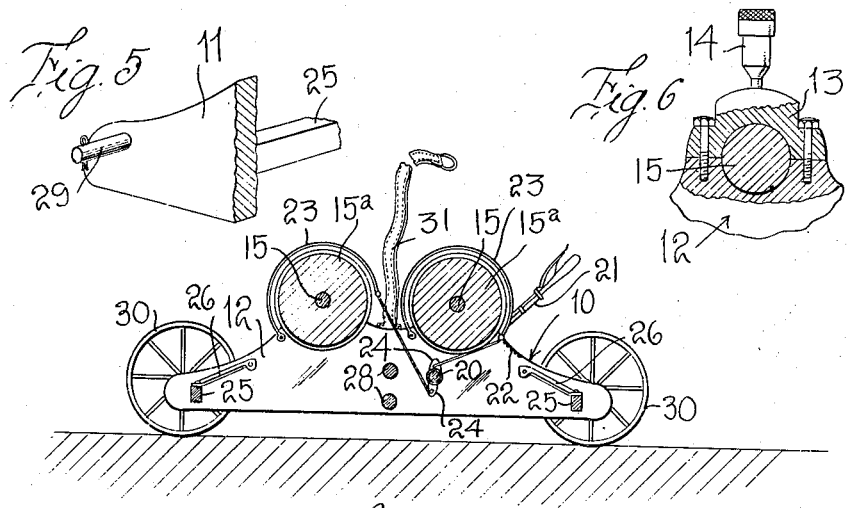
F. E. Dillman, Inventor
By Watson E. Coleman, Attorney

UNITED STATES PATENT OFFICE.

FOREST E. DILLMAN, OF TRAER, KANSAS.

AUTOMOBILE-OPERATED POWER PLANT.

1,263,215.

Specification of Letters Patent.   Patented Apr. 16, 1918.

Application filed March 21, 1917.  Serial No. 156,364.

*To all whom it may concern:*

Be it known that I, FOREST E. DILLMAN, citizen of the United States, residing at Traer, in the county of Decatur and State of Kansas, have invented certain new and useful Improvements in Automobile-Operated Power Plants, of which the following is a specification, reference being had to the accompanying drawings.

This invention relates to power transmission devices and particularly to means whereby an automobile may be used as a source of power, the construction being particularly adapted for use in garages, on farms, or like places.

The general object of my invention is to provide means whereby the motor of an automobile may be utilized as a source of power in places where a small engine could be used for driving machinery, etc.

A further object is to provide a construction of this character whereby the power of the automobile may be utilized and transmitted to small machinery, so constructed that the device may be shifted or transported from place to place as its services are needed.

A further object of the invention is to provide a construction of this character embodying a base having driving rollers upon which the driving wheels of the automobile may be run, these driving rollers being geared to each other so as to equalize the power transmitted from the driving wheels of the automobile and being provided with suitable transmission devices whereby the power delivered to the rollers mounted upon the base may be in turn transmitted to the machinery designed to be operated by the motor.

A further object is to provide in a construction of this character means whereby the power receiving rollers may be held from movement while the automobile is being run up on the rollers.

And a further object is to provide a construction of this character wherein the frame is mounted upon wheels so that it may be readily transported from place to place, which wheels are adapted to be removed so as to allow the base to rest flat down upon the floor of the workshop or other location where the device is being used.

Other objects will appear in the course of the following description.

My invention is illustrated in the accompanying drawings wherein:—

Fig. 3 is a section on the line 3—3 of Fig. 1;

Fig. 4 is a section on the line 4—4 of Fig. 1;

Fig. 5 is a fragmentary perspective view of one of the end members 11;

Fig. 6 is a fragmentary sectional view through one of the bearings for supporting the shaft 15.

Figure 1:
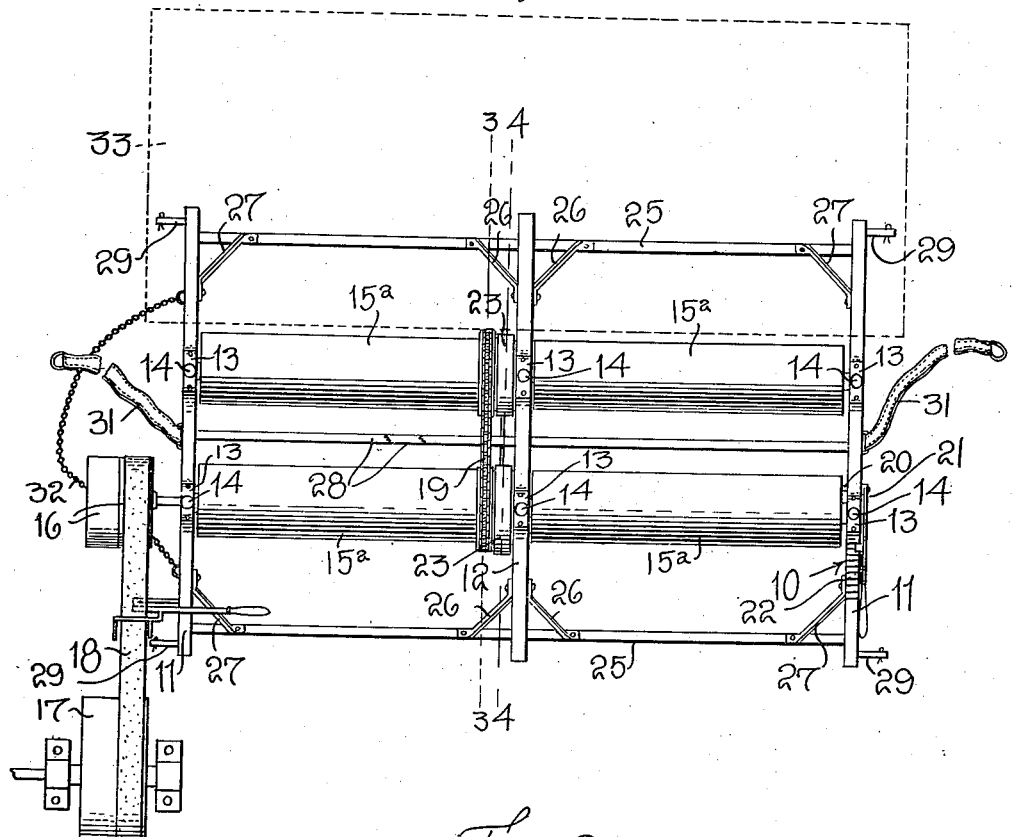
Figure 1 is a top plan view of my power transmission mechanism.
Figure 2:
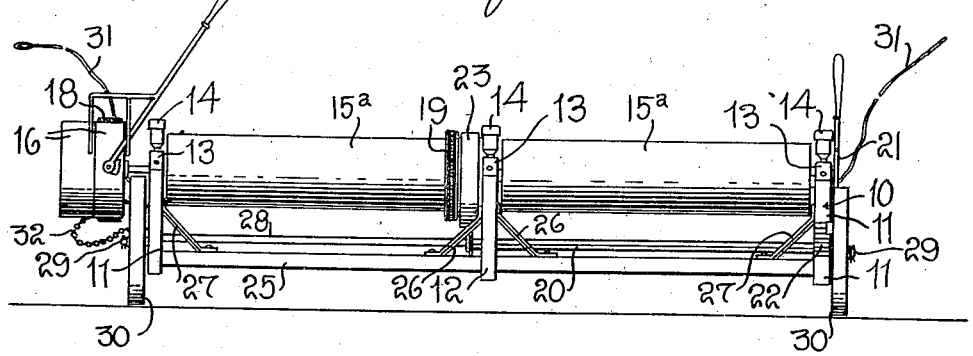
Fig. 2 is a side elevation thereof.

Referring to these drawings, 10 designates a base of any suitable character and having at its ends the upwardly extending walls 11 which may be made integral with the base or not, as is found most convenient. Between the walls 11 is disposed the medial wall 12 which, however, is constructed in the same manner as the walls 11. As illustrated, all of the walls 11 and 12 have their side edges extending upward and inward from the side edges of the base and have a depressed middle portion. These walls 11 and 12 are also provided each with a pair of bearings for shafts 15, these bearings being provided with caps 13, in the usual manner, held in place by screws. I do not wish to be limited to the particular character of the bearings used. Preferably the caps of the bearings are provided with the oil cups 14 whereby oil may be supplied to the bearings.

Mounted upon the shafts 15 which extend through the bearings are the rollers 15ᵃ. There are two pairs of these rollers disposed in parallel relation to each other, there being a pair of rollers disposed between the middle wall 12 and each of the end walls 11. The rollers 15ᵃ are keyed upon the shafts 15 and one of the shafts 15 extends out beyond the corresponding end wall 11 and is provided with the fast and loose pulleys or band wheels 16 whereby power may be transmitted to a driving pulley 17, the belt or band 18 being shiftable by means of the usual belt shifting devices. Preferably one pair of the rollers 15 is provided with a power transmitting chain 19 so that the power of one shaft 15 may be transmitted to the other shaft 15, so that both of these shafts will operate equally, the power will be equalized and the power of both of the shafts be transmitted to the shaft 13 which carries the fast and loose pulleys 16. While I have illustrated the chain 19 for the purpose of driving one of the rollers 15 from the other, I wish it understood that a belt might be used or that other power transmitting means between these two shafts or the two rollers on the shafts might be utilized.

It is necessary that the shafts 15 and the rollers 15ª be held from rotation while the automobile is being driven upon the rollers. To this end I provide a longitudinally extending shaft 20 which is rotatably supported in the several walls 11 and 12 and which at one end is provided with the operating handle 21. This handle moves over an arcuate rack 22 and is provided with any ordinary or usual detent for locking the lever in adjusted position upon the detent rack 22. Partially or entirely surrounding one pair of the rollers 15ª are the band brakes 23 and these band brakes are connected by means of suitable links to the arms 24 which extend out from the shaft 20. It will now be obvious that by rotating the shaft in one direction, the brakes will be applied to the rollers 15ª and thus to the shafts 15 and that a shifting of the lever in the opposite direction will release these brakes. The lever or handle 21 is to be forced down so as to cause the brakes to bind firmly on the rollers and the detent device will automatically lock the handle in its braking position. At this time the automobile may be driven upon the rollers 15ª and when the driving wheels of the automobile are properly mounted upon the rollers, the brake may be released.

Preferably the end walls are braced from each other by means of longitudinally extending rods in the nature of bolts, these rods being designated 25, the middle wall 12 being braced from these rods by the braces 26 and the end walls being also braced by braces 27. These members 25, 26 and 27 may be formed of angle iron, if desired. Preferably there is a longitudinally extending brace rod 28 which extends through the end walls and through the middle wall and is provided with cap nuts so as to engage these walls firmly and assist in bracing the walls from each other.

In order that the power plant heretofore described may be readily transported from place to place, I provide on the outer faces of the walls 11 at the corners of the base, the outwardly projecting stub axles 29 upon which wheels 30 may be detachably mounted, or I may provide any other desirable means whereby the wheels 30 may be placed in operative position or removed and shifted to an inoperative position. Attached to the end walls 11 are the straps 31 which are adapted to be fastened to the automobile or truck when the latter is in position on the rollers so as to thereby steady the motion of the device. It is convenient to have a chain or other draft device attached to one of the end walls, this draft device being shown as a chain, designated 32.

I do not wish to be limited to any particular form of the base or supporting frame, but it is obvious that this should be as light as possible, consistent with the proper strength. It is, furthermore, obvious that by removing the upper sections of the journal boxes with their oil cups, the shafts and rollers may be removed from their journal bearings for repair or replacement.

While this power plant is intended to be portable, it may rest upon the ground or floor of the garage or building and an upwardly inclined runway 33 may be used for running the rear wheels of the automobile upon the rollers 15. Where it is to be used as a permanent power plant, however, the frame with its rollers, etc., may be set in a pit in the earth deep enough for the rear walls of the automobile or truck to be backed upon it and dropped into position upon the rollers.

It is obvious that many variations may be made in the details of construction and arrangements of the various parts and that connections may be readily made from the device for running small machinery, such as washing machines, grind-stones, pumps, separators, etc., and thus the automobile engine used not only for its ordinary purpose, but also for doing a great deal of work around the farm or garage which would ordinarily require a second engine.

I am, of course, aware that the driving power of an automobile has been heretofore used for driving machinery, but my invention contemplates a means for conveniently transmitting the power from the driving wheels of the automobile to the small machinery, without the necessity of rigging up any transmitting device on the automobile itself. The rollers 15 should be of sufficient length so that the driving wheels of automobiles or trucks of various makes may be supported between the end walls and on the rollers 15.

Having thus described my invention, what I claim is:—

A power transmission device for automobiles including a base comprising vertical end walls and a vertical intermediate wall, longitudinally extending members connecting the ends and middles of the walls, a pair of parallel shafts mounted in bearings in the end walls and intermediate wall, two pairs of wooden rollers mounted upon and to rotate with the shafts, there being a pair of rollers on each shaft and disposed on each side of the intermediate wall, said rollers having uniform diameter from end to end, sprocket wheels on the shafts disposed adjacent the intermediate wall, a sprocket chain connecting the sprocket wheels, power transmitting means carried by one of the shafts at one end thereof, brake members disposed adjacent the intermediate wall and having frictional engagement with the wooden rollers, means at one end of the base for manually controlling said brakes, said end and intermediate walls extending laterally beyond the rollers, and wheels removably mounted on the extremities of the end walls.

In testimony whereof I hereunto affix my signature in the presence of two witnesses.

FOREST E. DILLMAN.

Witnesses:
C. A. McCARTNEY,
B. T. DILLMAN.